(12) United States Patent
Ganjali et al.

(10) Patent No.: US 11,481,070 B1
(45) Date of Patent: Oct. 25, 2022

(54) SYSTEM AND METHOD FOR TOUCH SENSOR PANEL WITH DISPLAY NOISE CORRECTION

(71) Applicant: Apple Inc., Cupertino, CA (US)

(72) Inventors: Daniel Ganjali, Sunnyvale, CA (US); Michael Robert White, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/463,195

(22) Filed: Aug. 31, 2021

Related U.S. Application Data

(60) Provisional application No. 63/083,755, filed on Sep. 25, 2020.

(51) Int. Cl.
*G06F 3/041* (2006.01)
*G06F 3/044* (2006.01)
*G06F 17/17* (2006.01)

(52) U.S. Cl.
CPC ........ *G06F 3/04186* (2019.05); *G06F 3/0412* (2013.01); *G06F 3/0446* (2019.05); *G06F 3/041662* (2019.05); *G06F 17/17* (2013.01)

(58) Field of Classification Search
CPC ............... G06F 3/04186; G06F 3/0412; G06F 3/041662; G06F 3/0446; G06F 17/17
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |
| WO | 2017/151757 A1 | 9/2017 |

OTHER PUBLICATIONS

Final Office Action received for U.S. Appl. No. 16/107,037, dated Jan. 13, 2020, 17 pages.

(Continued)

*Primary Examiner* — Md Saiful A Siddiqui
(74) *Attorney, Agent, or Firm* — Kubota & Basol LLP

(57) ABSTRACT

Touch sensing performance can be improved using display noise correction. In some examples, a touch sensor panel in proximity to a display can capture a first touch image from a touch sensor panel concurrently with updating the display and a second touch image from the touch sensor panel concurrently with blanking the display (e.g., while the display is not updating). A composite touch image can be generated by summing a filtered first touch image and a filtered second touch image. The composite touch image can be further filtered using robust regression techniques to remove residual display noise.

20 Claims, 14 Drawing Sheets

(56) References Cited

U.S. PATENT DOCUMENTS

| | | | |
|---|---|---|---|
| 7,663,607 B2 | 2/2010 | Hotelling et al. | |
| 8,479,122 B2 | 7/2013 | Hotelling et al. | |
| 8,520,913 B2 | 8/2013 | Dean et al. | |
| 9,098,148 B2 | 8/2015 | Sharma | |
| 9,146,630 B2 | 9/2015 | Choi et al. | |
| 9,164,618 B2 | 10/2015 | Perski et al. | |
| 9,244,545 B2 | 1/2016 | Hinckley et al. | |
| 9,256,321 B2 | 2/2016 | Wang et al. | |
| 9,558,455 B2 | 1/2017 | Johnson et al. | |
| 9,904,412 B2 | 2/2018 | Stevenson et al. | |
| 10,261,685 B2 | 4/2019 | Deselaers et al. | |
| 10,345,970 B2 | 7/2019 | Qiao et al. | |
| 10,928,955 B1 | 2/2021 | Reed et al. | |
| 2006/0197753 A1 | 9/2006 | Hotelling | |
| 2012/0056846 A1 | 3/2012 | Zaliva | |
| 2012/0194452 A1 | 8/2012 | Cho et al. | |
| 2012/0249433 A1 | 10/2012 | Deng et al. | |
| 2014/0062949 A1 | 3/2014 | Chang et al. | |
| 2014/0071360 A1* | 3/2014 | Chang | G06F 3/0416 349/12 |
| 2014/0118297 A1 | 5/2014 | Huang et al. | |
| 2015/0091850 A1* | 4/2015 | Morein | G06F 3/0412 345/174 |
| 2015/0242009 A1 | 8/2015 | Xiao et al. | |
| 2016/0196003 A1 | 7/2016 | Yoon et al. | |
| 2016/0291792 A1 | 10/2016 | Sawahata et al. | |
| 2017/0003785 A1* | 1/2017 | Berget | G06F 3/0445 |
| 2017/0090670 A1 | 3/2017 | Stevenson et al. | |
| 2017/0139527 A1 | 5/2017 | Nathan et al. | |
| 2018/0059852 A1 | 3/2018 | Sterling et al. | |
| 2018/0329542 A1 | 11/2018 | Forlines et al. | |
| 2019/0122076 A1 | 4/2019 | Sen et al. | |
| 2020/0142532 A1 | 5/2020 | Kravets et al. | |
| 2020/0241691 A1 | 7/2020 | Kobayashi | |
| 2021/0191563 A1 | 6/2021 | Reed et al. | |

OTHER PUBLICATIONS

Non-Final Office Action received for U.S. Appl. No. 16/107,037, dated Jul. 30, 2019, 15 pages.

Non-Final Office Action received for U.S. Appl. No. 16/107,037, dated May 6, 2020, 20 pages.

Notice of Allowance received for U.S. Appl. No. 16/107,037, dated Oct. 22, 2020, 9 pages.

Notice of Allowance received for U.S. Appl. No. 17/177,977, dated Nov. 4, 2021, 9 pages.

Huy Viet Le et al., "Hand-and-Finger-Awareness for Mobile Touch Interaction using Deep Learning", University of Suttgart, Germany, 2019, 258 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

\* cited by examiner

SYSTEM AND METHOD FOR TOUCH SENSOR PANEL WITH DISPLAY NOISE CORRECTION

CROSS-REFERENCE TO RELATED APPLICATION

This application claims the benefit of U.S. Provisional Application No. 63/083,755, filed Sep. 25, 2020, which is hereby incorporated by reference in its entirety for all purposes.

FIELD OF THE DISCLOSURE

This relates generally to touch sensor panels, and more particularly to touch sensor panels with display noise correction.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel, and may accept "multi-touch gestures" as inputs.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

This relates generally to touch sensor panels, and more particularly to touch sensor panels with display noise correction. In some examples, a touch sensor panel in proximity to a display can receive a first touch image captured by a touch sensor panel concurrently with an updating of the display and a second touch image captured by the touch sensor panel concurrently with a blanking of the display (e.g., while the display is not updating). In some examples, common mode subtraction using one or more characteristic vectors of noise on the first image can generate a filtered first touch image (including filtering common mode noise as well as some common mode signal). In some examples, common mode signal can be estimated using the second touch image. For example, a weighted least squares regression can be used to fit one or more characteristic vectors to columns of the second touch image to filter the second touch image. The weights used for the weighted least squares regression can be computed based on the filtered first touch image. A composite touch image can be generated by summing filtered first touch image and the filtered second touch image (including the estimated common mode touch signal). The composite touch image can be further filtered using robust regression techniques (e.g., iterative re-weighted least squares regression, optionally regularized) to remove residual display noise. The cleaned composite touch image can be used for further touch processing to identify touches on a touch-sensitive surface of a device.

DETAILED DESCRIPTION

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

This relates generally to touch sensor panels, and more particularly to touch sensor panels with display noise correction. In some examples, a touch sensor panel in proximity to a display can receive a first touch image captured by a touch sensor panel concurrently with an updating of the display and a second touch image captured by the touch sensor panel concurrently with a blanking of the display (e.g., while the display is not updating). In some examples, common mode subtraction using one or more characteristic vectors of noise on the first image can generate a filtered first touch image (including filtering common mode noise as well as some common mode signal). In some examples, common mode signal can be estimated using the second touch image. For example, a weighted least squares regression can be used to fit one or more characteristic vectors to columns of the second touch image to filter the second touch image. The weights used for the weighted least squares regression can be computed based on the filtered first touch image. A composite touch image can be generated by summing filtered first touch image and the filtered second touch image (including the estimated common mode touch signal). The composite touch image can be further filtered using robust regression techniques (e.g., iterative re-weighted least squares regression, optionally regularized) to remove residual display noise. The cleaned composite touch image can be used for further touch processing to identify touches on a touch-sensitive surface of a device.

Figure 1A:
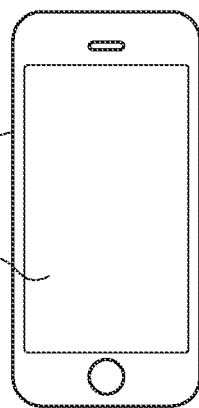
FIGS. 1A-1E illustrate touch sensing devices or systems that can include a touch screen or touch sensor panel according to examples of the disclosure.
Figure 1B:
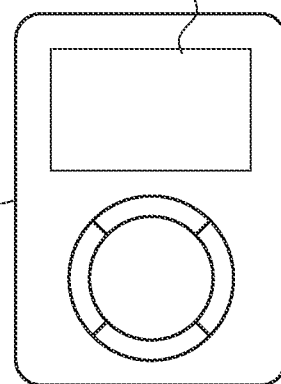
Figure 1C:
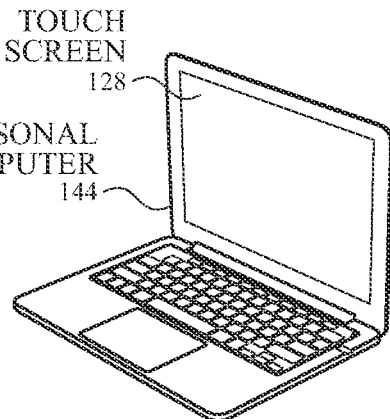
Figure 1D:
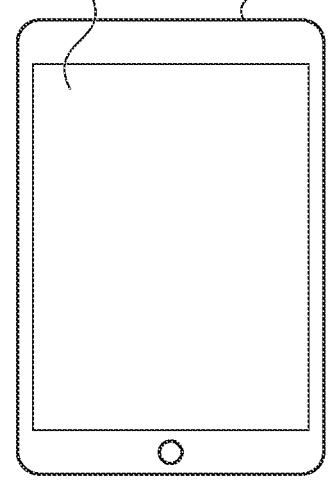
Figure 1E:
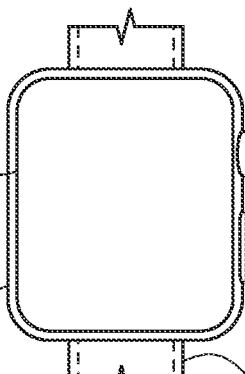

FIGS. 1A-1E illustrate touch sensing devices or systems that can include a touch screen or touch sensor panel according to examples of the disclosure. The touch screen or touch sensor panel can implement techniques for display noise correction. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures. Touch screens 124, 126, 128, 130 and 132 can be multi-touch touch screens that can detect multiple objects.

In some examples, touch screens 124, 126, 128, 130 and 132 and touch sensor panels can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
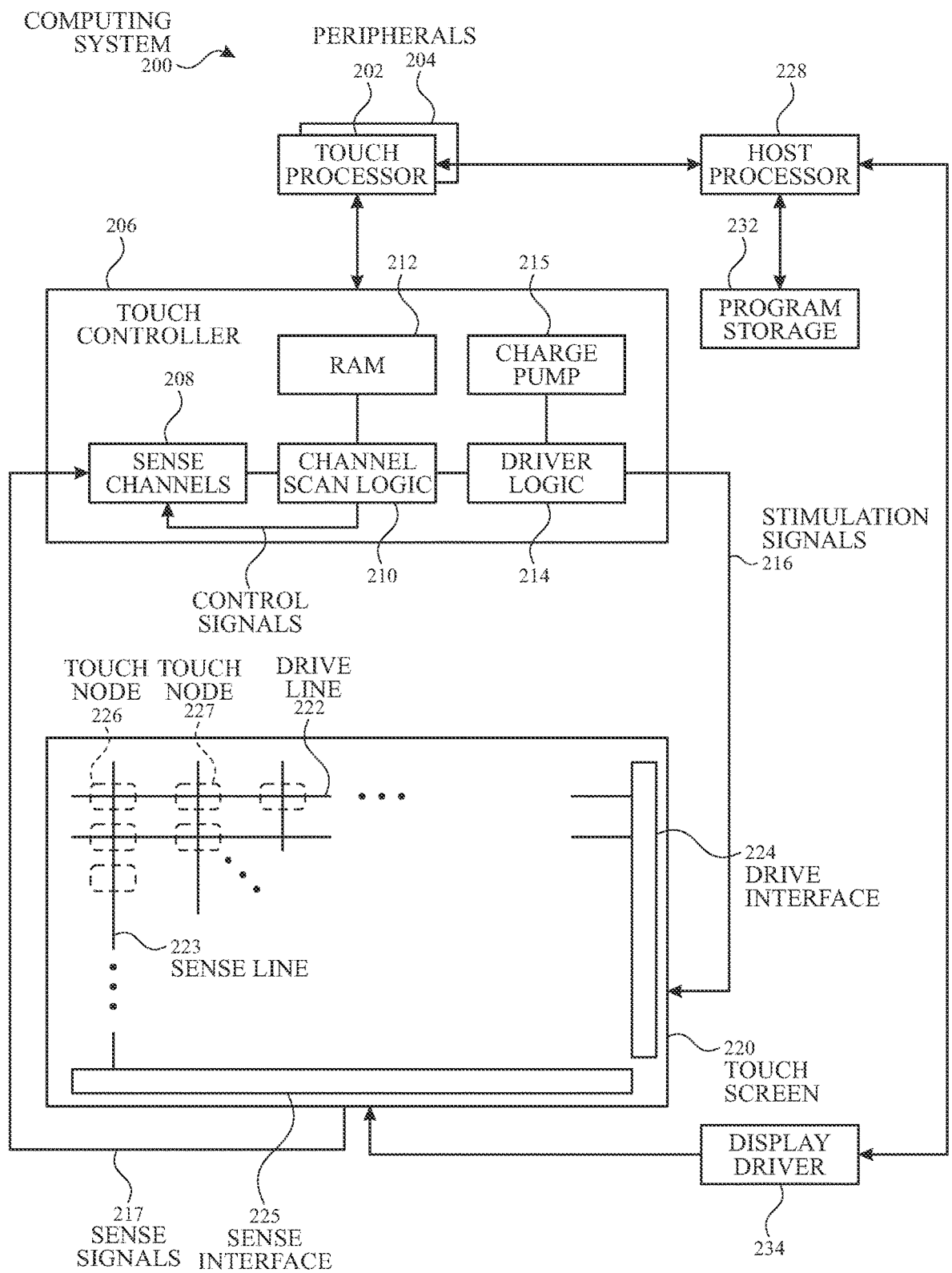
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can implement techniques of display noise correction for a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
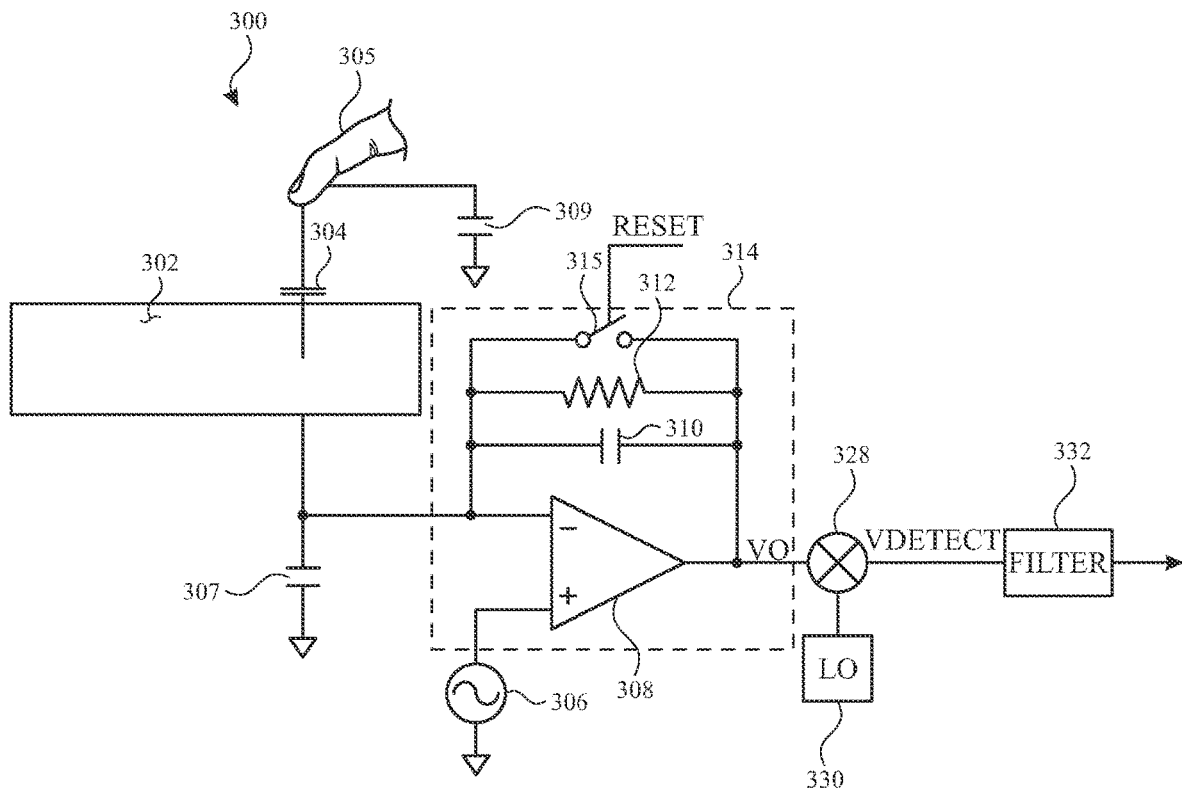
FIG. 3A illustrates a touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
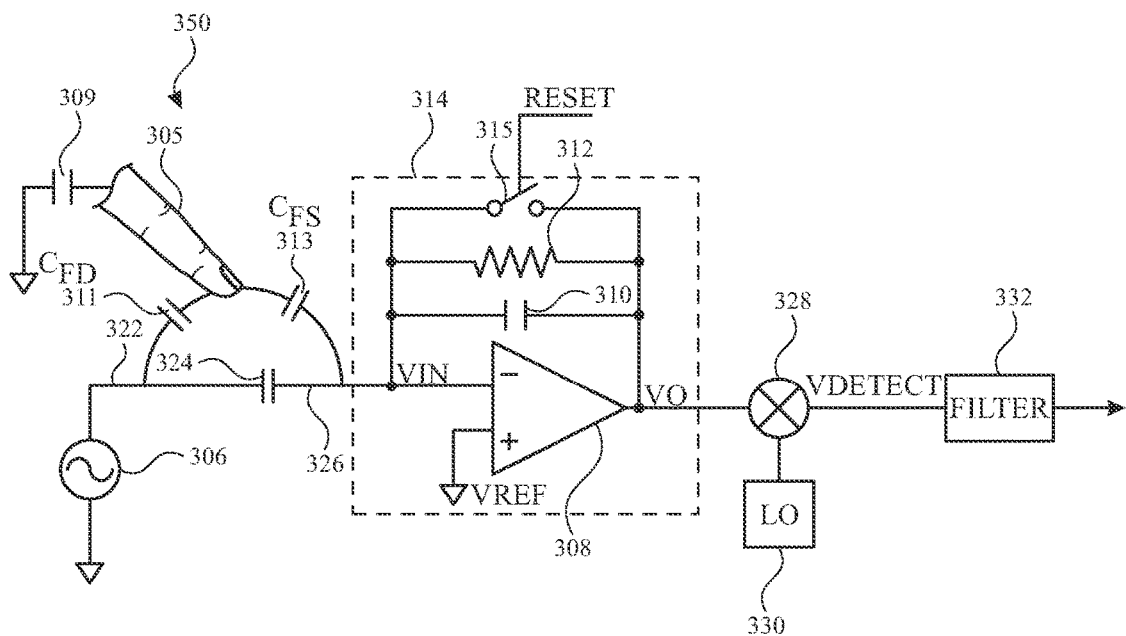
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
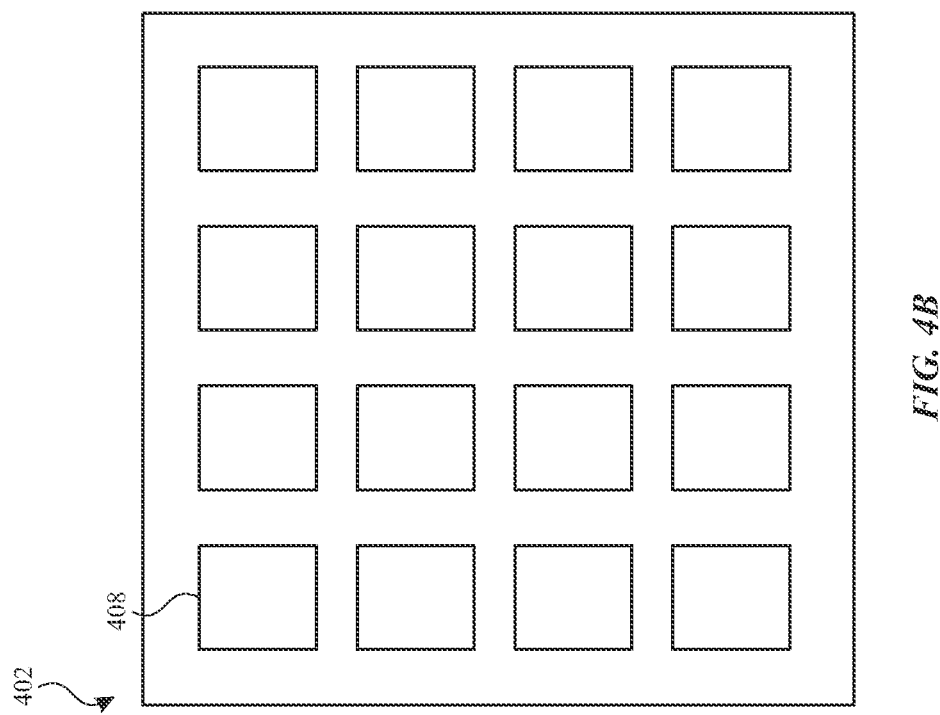
FIG. 4B illustrates a touch screen or touch sensor panel with touch node electrodes arranged in a pixelated touch node electrode configuration according to examples of the disclosure.
Figure 4A:
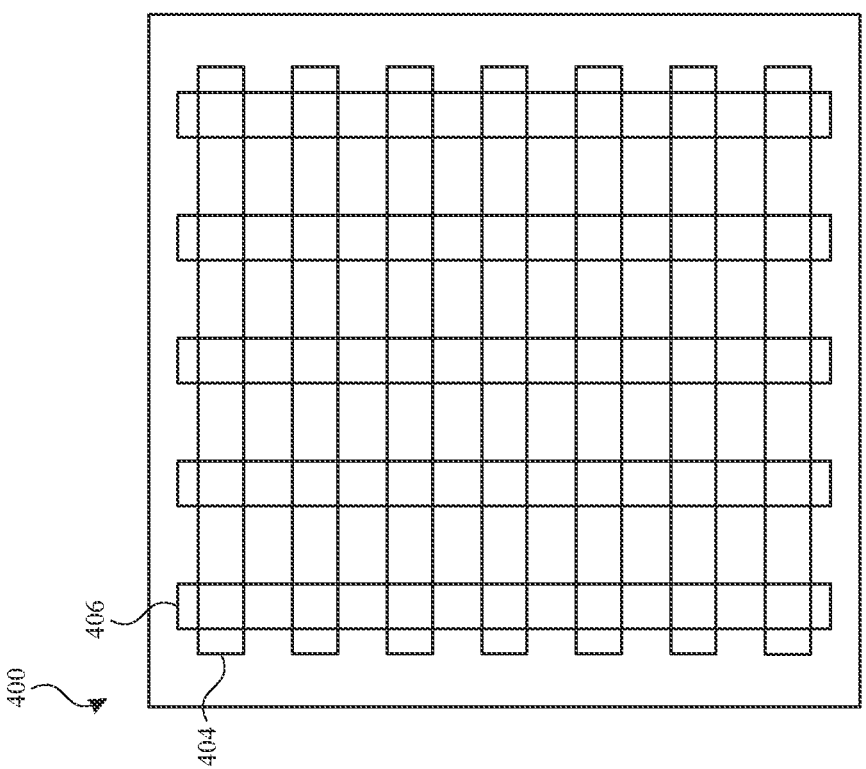
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

As described herein, in some examples, due to the proximity of a display of a touch screen and a touch sensor panel (e.g., touch electrodes) of the touch screen, the touch and/or display performance can be degraded (e.g., due to capacitive coupling between the touch electrodes and display data lines). For example, driving touch electrodes can cause display artifacts that can be visible to the user. As another example, updating the display can impact signal at touch nodes resulting in errors in touch detection (e.g., injecting noise into the touch system). For example, the errors in touch detection can include inaccurately detecting the location, size, and/or shape of a touching or proximate object. Degraded touch performance can cause user experience to suffer. In some examples, touch sensing and display updating operations can be time-multiplexed to avoid interference therebetween. In some examples, a shielding or guarding layer between the display and the touch electrodes can reduce interference therebetween. In some examples, performance of the touch screen can be improved using display noise correction techniques described herein to reduce the amount of noise injected into the touch data (e.g., from the display and from other noise noises). Display noise correction techniques can provide flexibility to improve touch screen performance for thinner touch screens (e.g., without shielding layers between touch and display systems) and for touch screens with concurrent touch sensing and display updating operations.

Figure 5A:
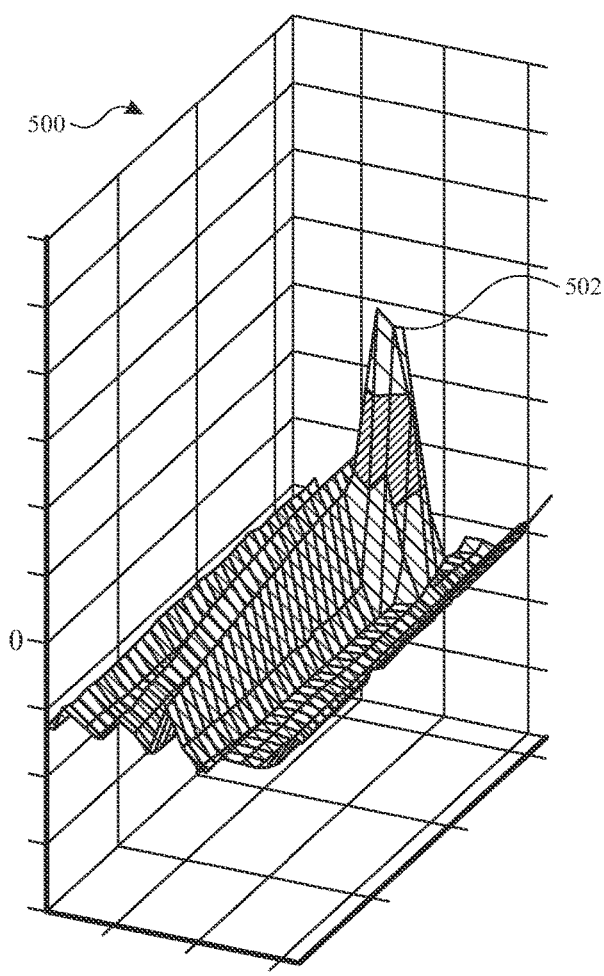
FIGS. 5A-5D illustrate example touch images before and after display noise correction according to examples of the disclosure.
Figure 5B:
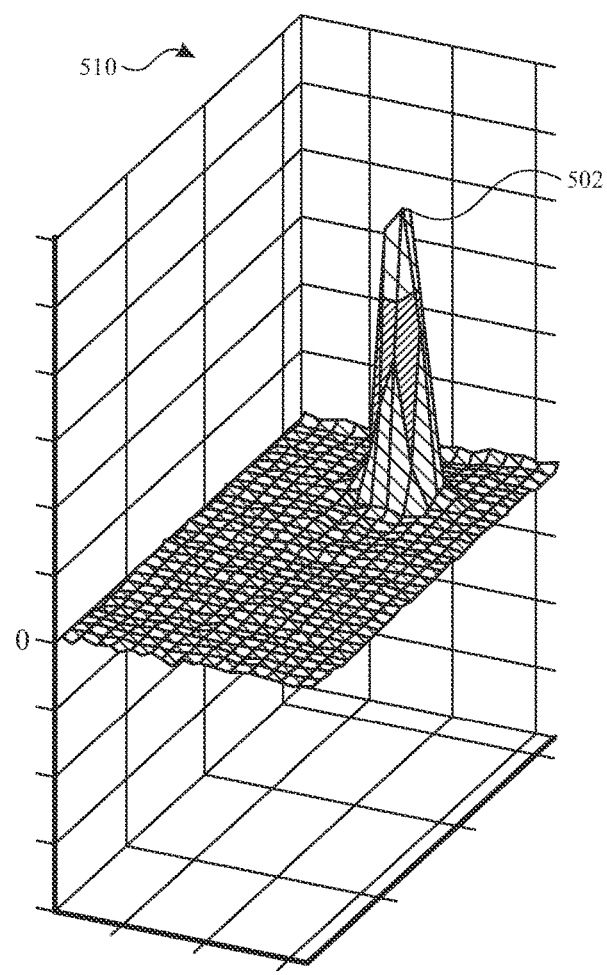
Figure 5C:
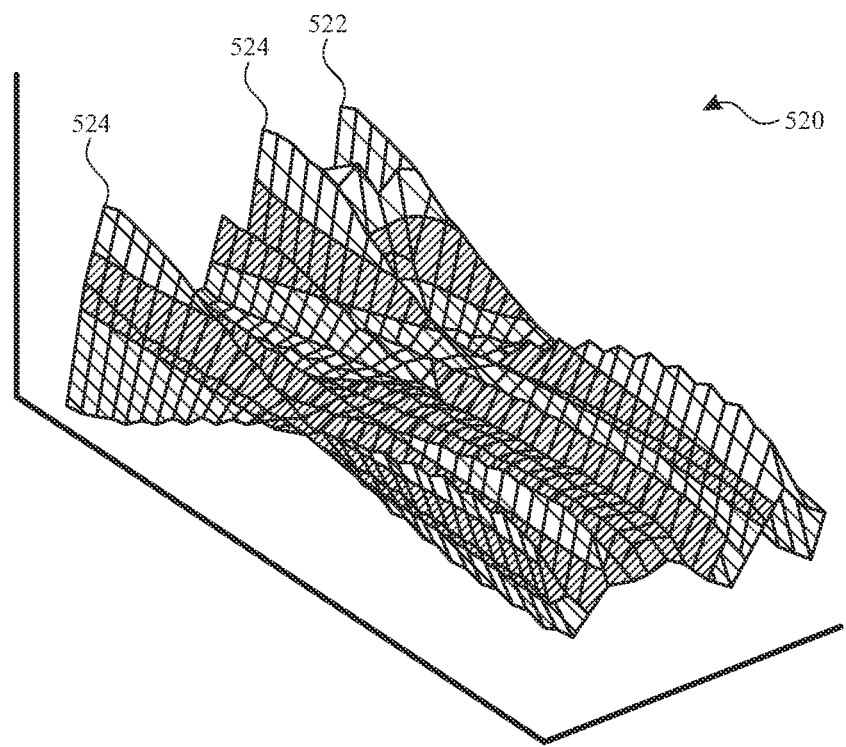
Figure 5D:
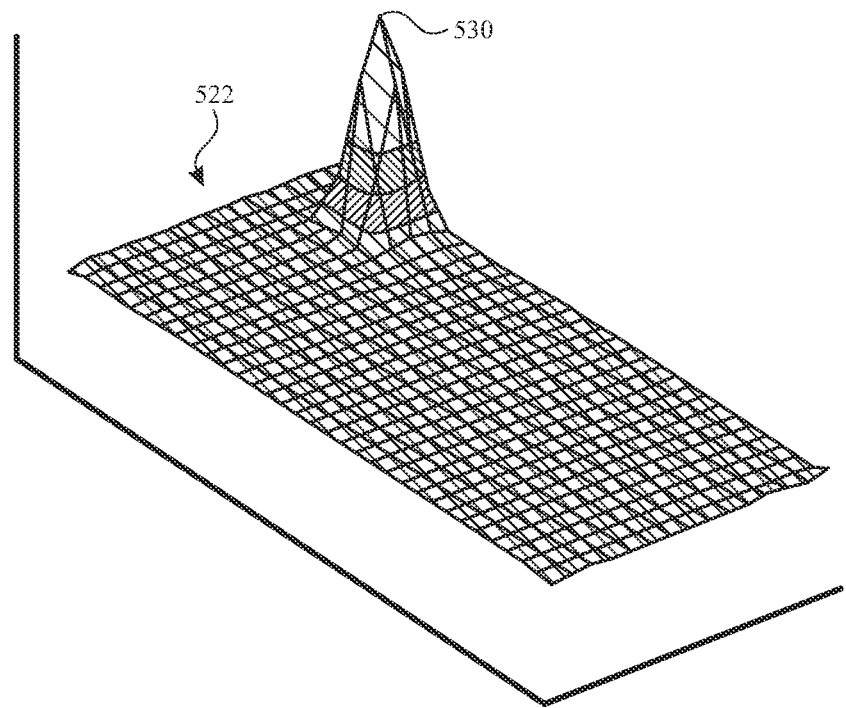

FIGS. 5A-5D illustrate example touch images before and after display noise correction according to examples of the disclosure. FIG. 5A illustrates a touch image 500 including a peak 502 at a location corresponding to an object in contact with (or proximity to) a touch screen and including noise (including noise from the display) represented by the divergence in the amplitude from zero. FIG. 5A can correspond to a touch image representing the touch signal measured at the plurality of touch nodes of the touch sensor panel before display noise correction as described herein. FIG. 5B illustrates a touch image 510 after display noise correction that includes peak 502 with little or no noise in the remainder of the touch image (e.g., the divergence in the amplitude from zero is less than a threshold). FIG. 5C illustrates a touch image 520 including a peak 522 at a location corresponding to an object in contact with (or proximity to) a touch screen and including noise (including noise from the display) represented by the divergence in the amplitude from zero. FIG. 5C can correspond to a touch image representing the touch signal measured at the plurality of touch nodes of the touch sensor panel before display noise correction as described herein. FIG. 5D illustrates a touch image 530 after display noise correction that includes peak 522 with little or no noise in the remainder of the touch image (e.g., the divergence in the amplitude from zero is less than a threshold). As is evident from FIGS. 5A and 5C, peaks 502 and 522, respectively, can be difficult to distinguish as touch from the noise due to the display without the display noise correction described herein. In particular, peak 522 can be difficult to distinguish from peak(s) 524 in the display noise that correspond(s) to location(s) of the touch sensor panel without an object in contact (or proximity).

Figure 6:
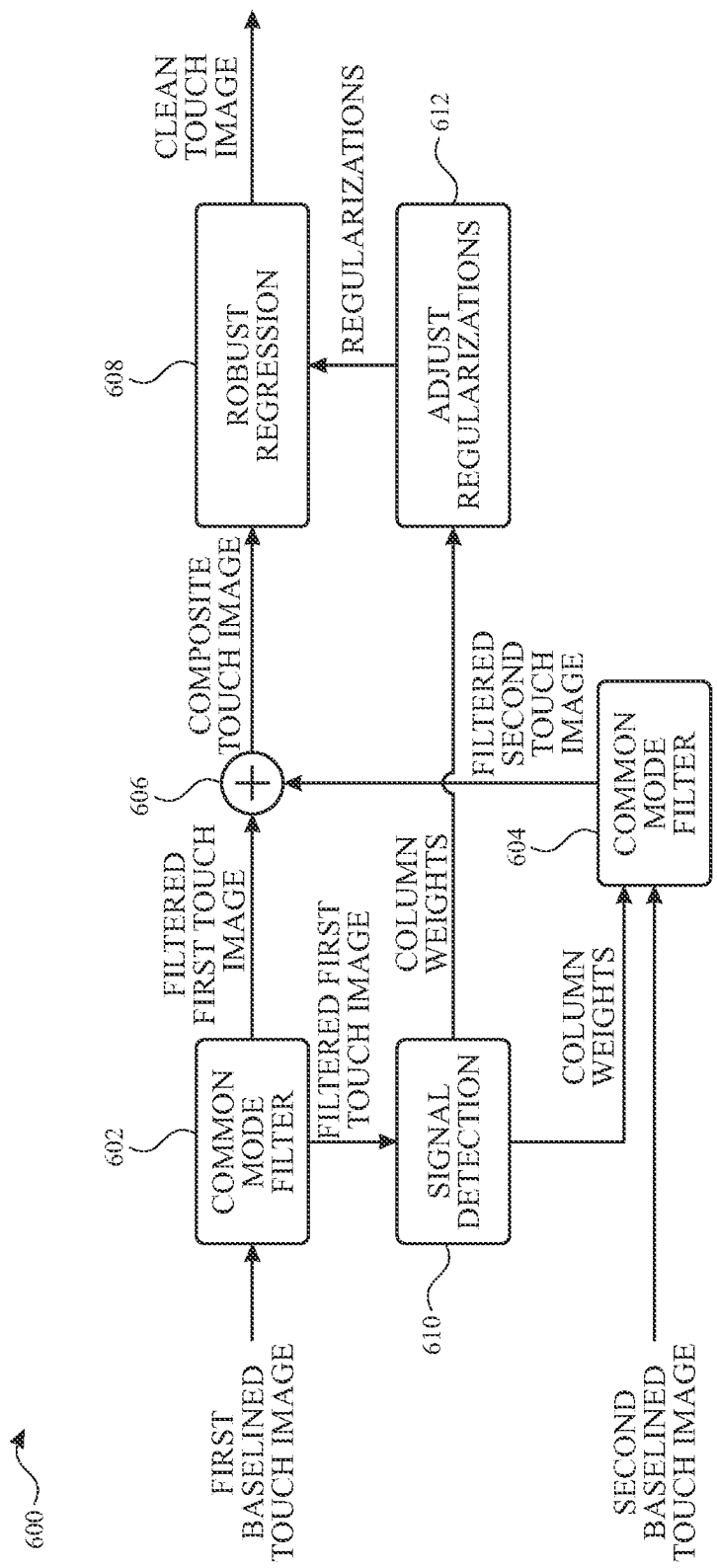
FIG. 6 illustrates an example block diagram for display noise correction according to examples of the disclosure.

FIG. 6 illustrates an example block diagram 600 for display noise correction according to examples of the disclosure. In some examples, block diagram 600 can be implemented in touch controller 206 and/or touch processor 202. In some examples, block diagram 600 can be implemented using hardware, software, firmware or a combination thereof. The display noise correction can use two touch images as inputs. A first touch image can be captured by sensing the touch electrodes of a touch sensor panel concurrently with display update operations and a second touch image can be captured by sensing the touch electrodes of a touch sensor panel when display update operations are not occurring. For example, the second touch image can be captured during a display blanking. The display noise correction can include performing common mode subtraction on the first image at block 602 to generate a common mode filtered first touch image. The display noise correction can include estimating common mode signal using the second touch image at block 604 to generate an estimated common mode signal touch image (also referred to herein as a filtered second touch image). A composite touch image can be generated by summing common mode filtered first touch image and the estimated common mode signal touch image at block 606. The composite image can be further filtered at block 608 using linear regression techniques to remove residual display noise and generate as an output a filtered touch image for further touch processing (e.g., identification of touch or proximity inputs).

In some examples, the first and second touch images can be baselined touch images. In some examples, a baselined touch image can filter the touch image by subtracting baseline touch data (e.g., a baseline image) from the captured touch image data measured by the sensing circuitry. In some examples, the baseline touch data (e.g., baseline image) can be a touch image previously captured while the system determined that there was no touch activity (e.g., no object in proximity or contact with the touch screen or touch sensor panel). Thus, in some examples, the baseline touch data comprises the touch node measurements for the touch nodes of the touch sensitive surface that represent the state of the touch nodes during a steady state (e.g., when there is no touch activity). In some examples, the baseline touch data is represented as a grid (e.g., two dimensional array, such as a matrix) of numerical values representing the baseline touch signal (e.g., capacitance value) at each scanned touch node. In some examples, applying the baseline to the captured touch image filters out background noise as a result of environmental factors, stray capacitances, parasitic capacitances, etc. (e.g., when these effects are embodied in the captured baseline image).

In some examples, each column of the touch sensor panel can have a characteristic noise profile (also referred to herein as a "column noise profile") due to correlated noise from the display). In some examples, the characteristic noise profile can be characterized using one or more or characteristic vectors. For example, the characteristic noise profile can be characterized using a linear combination of characteristic vectors. In some examples, the filtering described in block diagram 600 can use characteristic vectors to remove noise.

Figure 7:
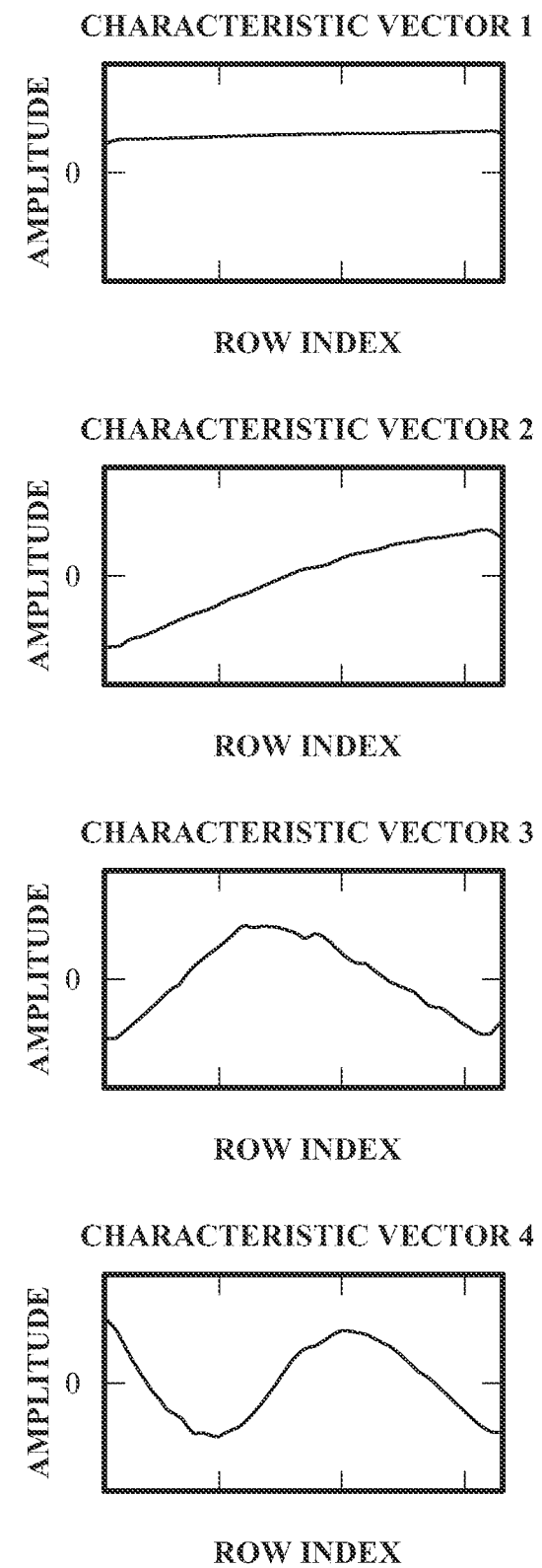
FIG. 7 illustrates example characteristic vectors according to examples of the disclosure.

FIG. 7 illustrates example characteristic vectors according to examples of the disclosure. For example, FIG. 7 illustrates a first characteristic vector (labeled "characteristic vector 1"), a second characteristic vector (labeled "characteristic vector 2"), a third characteristic vector (labeled "characteristic vector 3"), and a fourth characteristic vector (labeled "characteristic vector 4") for a column. The characteristic vectors of FIG. 7 are plotted with row index (for the column in the touch image/touch sensor panel) on the x-axis and with signal magnitude on the y-axis. The example characteristic vectors of FIG. 7 show a constant offset characteristic for the first characteristic vector, a linear slope characteristic for the second characteristic vector, a quadratic characteristic for the third characteristic vector, and a cubic characteristic for the fourth characteristic vector. It is understood that FIG. 7 illustrates characteristic vector for one column of a touch sensor panel, but that each column of the touch sensor panel can have its own characteristic vectors, in some examples. It is understood that these characteristic vectors of FIG. 7 are examples, but different touch screens can have different characteristic vectors.

Characteristic vectors can be generated for a touch at calibration (e.g., using empirical measurements) and stored in the touch screen device (e.g., in memory). For example, while there are no objects touching or proximate to the touch screen, the touch screen can perform touch sensing operations to collect touch data while different calibration images are displayed on the display of the touch screen. The collected touch data can include display noise corresponding to the different displayed images. One or more characteristic vectors indicative of the noise data can be calculated for the collected touch data. For example, singular value decomposition (SVD) or principal component analysis (PCA) can be used on the collected touch data and the characteristic vector(s) can correspond to the singular values or principle components from the SVD or PCA calculations. In some examples, the one or more characteristic vectors can include a subset of the singular values or principal components. For example, the characteristic vectors can be ranked according to relevance/importance and a predetermined number of characteristics vectors can be stored and used for the processing described herein. For example, most of the noise may appear in the first and/or second principal components (e.g., a constant offset and a linear component with a slope). In some examples, 3-6 characteristic vectors can be used. In some examples, fewer or more than 3-6 characteristics can be used. In some examples, all the characteristic vectors can be used. However, generally speaking the number of characteristic vectors to use can be a tradeoff between processing complexity and accuracy of the noise modeling. Using more characteristic vectors can improve the accuracy of the noise modeling but can also increase the processing complexity; using fewer characteristic vectors can reduce accuracy of the noise modeling but reduce the processing complexity.

Referring back to FIG. 6, the common mode subtraction at block 602 can be used to remove common mode from columns of the image to generate a filtered first touch image. In some examples, the sensing circuitry that senses the touch electrodes can remove some (e.g., 50%, 75%, 90%, etc.) of the common mode (e.g., using sensing circuitry with common mode rejection characteristics). In some examples, the common mode subtraction performed at block 602 can remove some or all of the remaining common mode from columns in the input touch image. In some examples, the common mode subtraction can be achieved by subtracting, for each column in the touch image, a projection of the respective column vector onto a first characteristic vector for the respective column. Expressed mathematically, for a respective column vector of the touch signals in the touch image ($\vec{c}$) can be replaced by $\vec{c}-(\vec{s}-\vec{c})*\vec{s}$, where $\vec{s}$ represents the characteristic vector as a unit vector and $\vec{s}\cdot\vec{c}$ represents the dot product of the characteristic vector and the column vector. Column vector $\vec{c}$ and characteristic vectors can both have a length equal to the number of rows in the touch sensor panel. In some examples, the first characteristic vector can be a most significant characteristic vector (e.g., corresponding to the first principal component). In some examples, as a result of the common mode subtraction, the mean of the touch signal values in each column of the first filtered touch image can be zero (or within a threshold of zero). Although the common mode subtraction above describes subtracting the projection of the respective column vector onto a first characteristic vector, it should be understood that, in some examples, the common mode subtraction can be used to subtract the projection of the respective column vector onto additional characteristic vectors.

In some examples, the common mode subtraction at block 602 can remove common mode touch signal in addition to removing common mode noise. Removing the latter may be beneficial to remove noise, but removing the former can cause loss of the touch signal corresponding to touch or proximity of an object to the touch screen. In some examples, as described herein, the common mode touch signal can be estimated using a second touch image (at block 604) and combined with the filtered first touch image (e.g., added to the filtered first touch image at block 606). As a result, the composite touch image can include the correct (or within a threshold of the correct) amount of common mode touch signal with reduced common mode noise compared with the input first touch image.

The second touch image, by virtue of being performed during a blanking period of the display (e.g., while the display is not updating), can have reduced display noise compared with the first touch image. In particular, the display noise injected into the touch system can be viewed as having a mean offset component and a standard deviation component from the mean offset component. The standard deviation component of the display noise can be absent (or reduced) from the second touch image because the display is blanking (not updating) during the capture of the second touch image. However, the second touch image can still include a mean offset component of display noise due to the display image being displayed on the touch screen (e.g., where the mean can be dependent on the image displayed on the touch screen) in addition to a measure of the common mode touch signal (e.g., a sum of the touch signals in each column or a mean of the touch signals in each column). The estimate of common mode signal at block 604 can include using a weighted least squares regression (or other suitable fitting or filtering technique) to filter the second touch image to remove the mean offset component of the display noise. The weights for the least squares regression can be column weights derived from the first touch image (e.g., from the filtered first image output at block 602). The weights can be used to fit the linear regression to the mean offset component of the display noise and to avoid fitting the linear regression to the touch signal from an object touching or proximate to the touch sensor panel).

In some examples, at block 610 touch signal detection can be performed to identify columns weights. For example, lesser weight can be applied to touch signals in a column vector indicative of a true touch and greater weight can be applied to touch signals in a column vector indicative of noise. In some examples, the column weights for a respective column can be computed using the following expression:

$$W_{ii} = \frac{\sigma_n}{\max(\sigma_n, |\hat{f}|)},$$

where $\sigma_n$ can represent a constant threshold corresponding to the noise threshold of the touch sensor panel (e.g., Gaussian white noise), $|\hat{f}|$ can represent the magnitude vector of the touch signal for the column, and $W_{ii}$ can represent the weight matrix. For touch signals in the column vector less than the noise threshold of the touch sensor panel, a maximum weight of 1 can be assigned using the above expression. For touch signals in the column vector greater than the noise threshold of the touch sensor panel, a weight of $\sigma_n/|\hat{f}|$, between 0 and 1, can be assigned used the above expression.

Figure 8A:
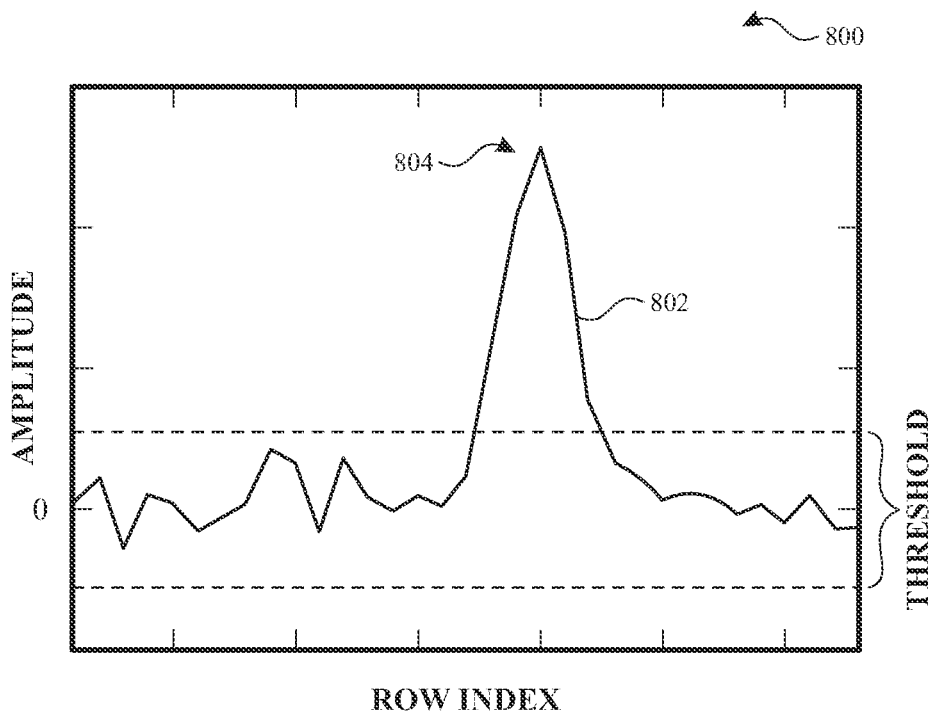
FIGS. 8A-8B illustrate an example plot of a column vector and an example plot of a corresponding weight vector according to examples of the disclosure.
Figure 8B:
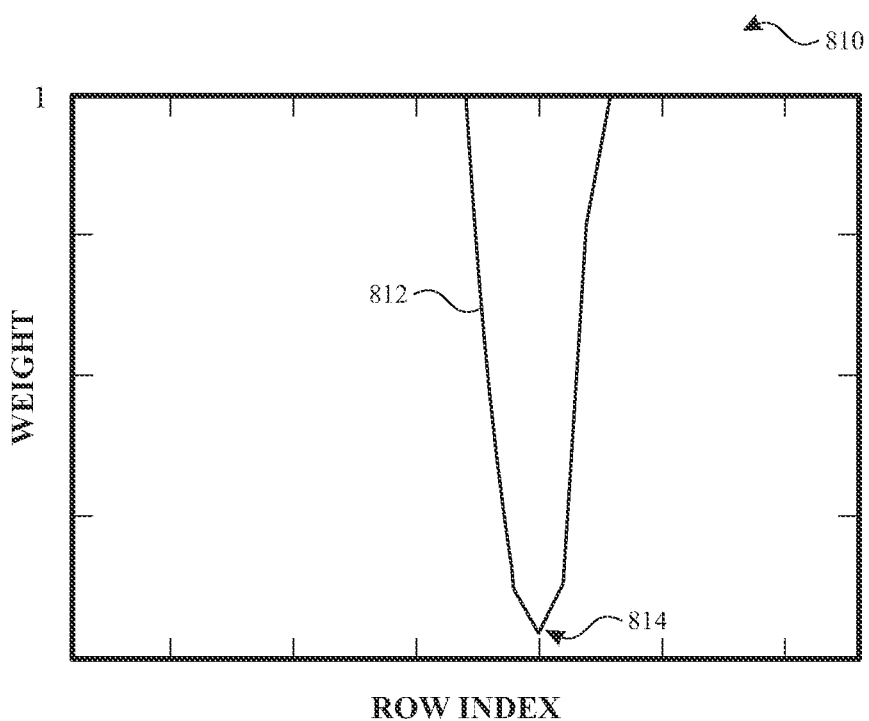
Figure 9A:
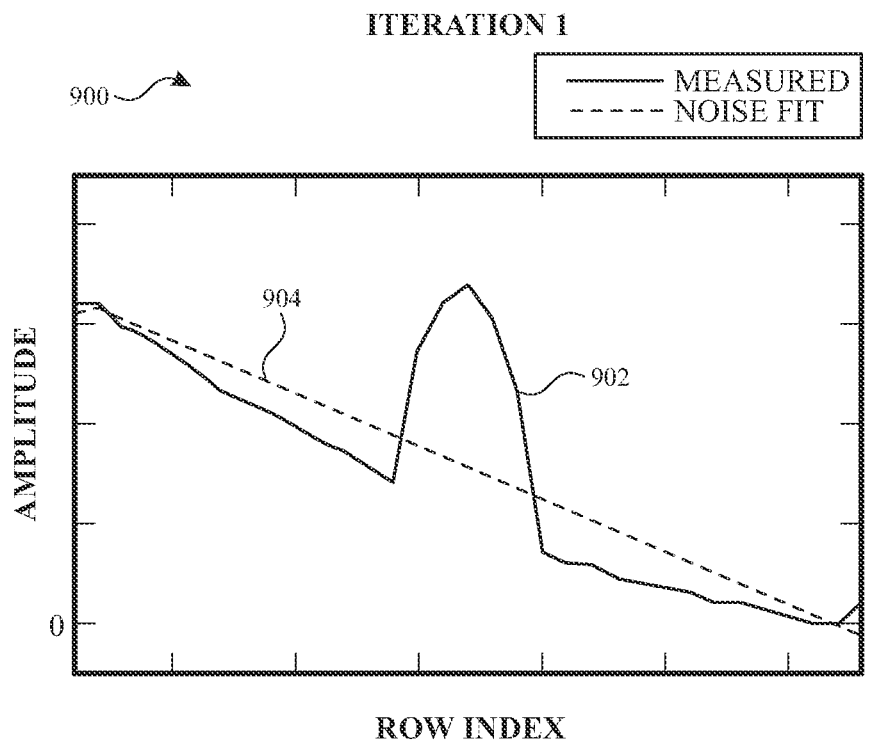
FIGS. 9A-9F illustrate example plots of iterations of an iterative reweighted least squares regression according to examples of the disclosure.
Figure 9B:
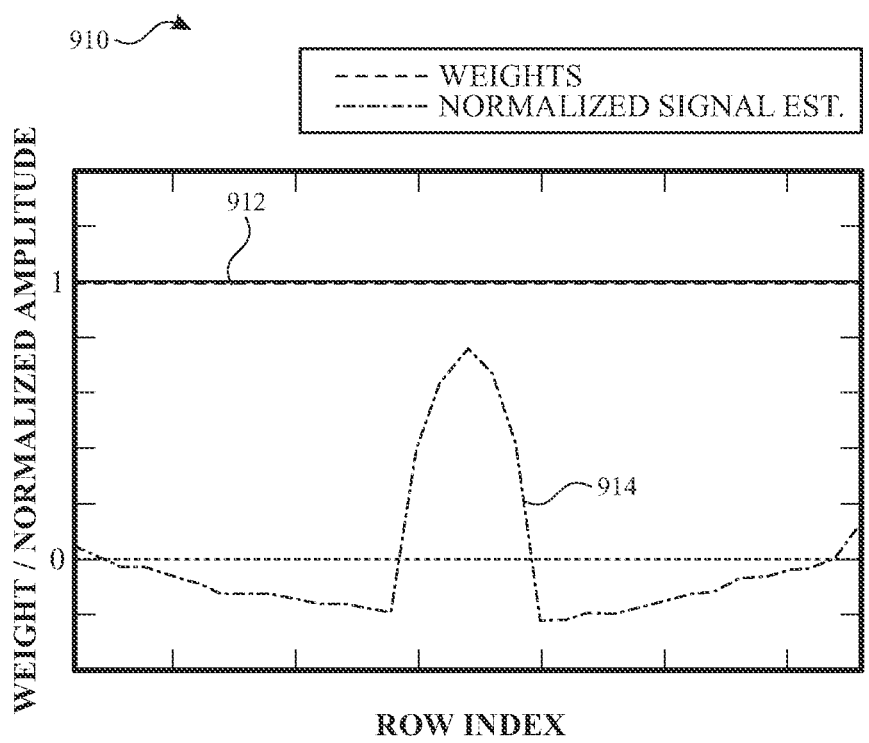
Figure 9C:
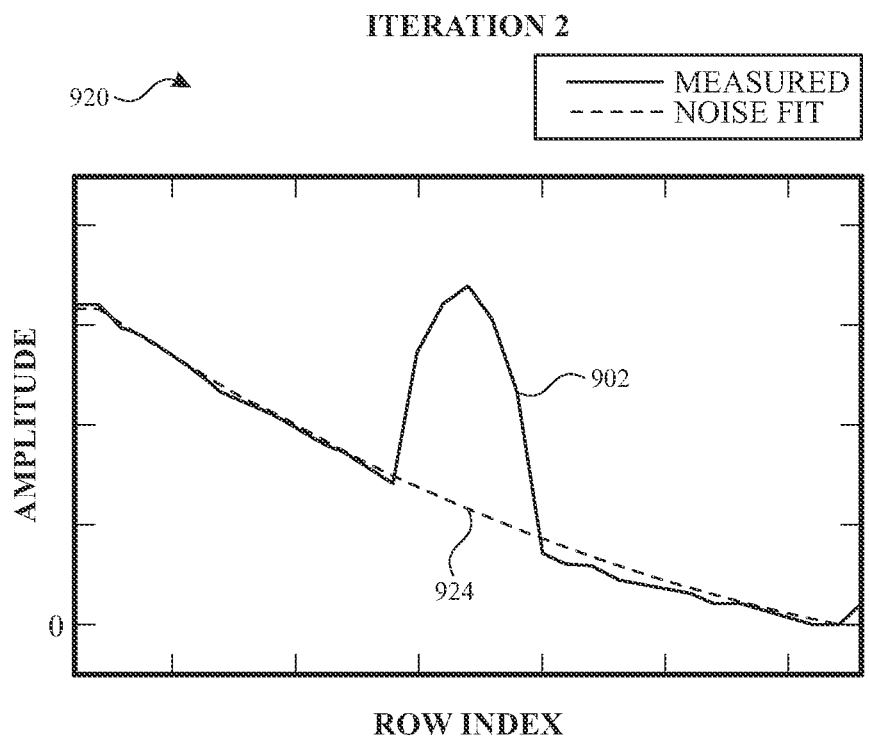
Figure 9D:
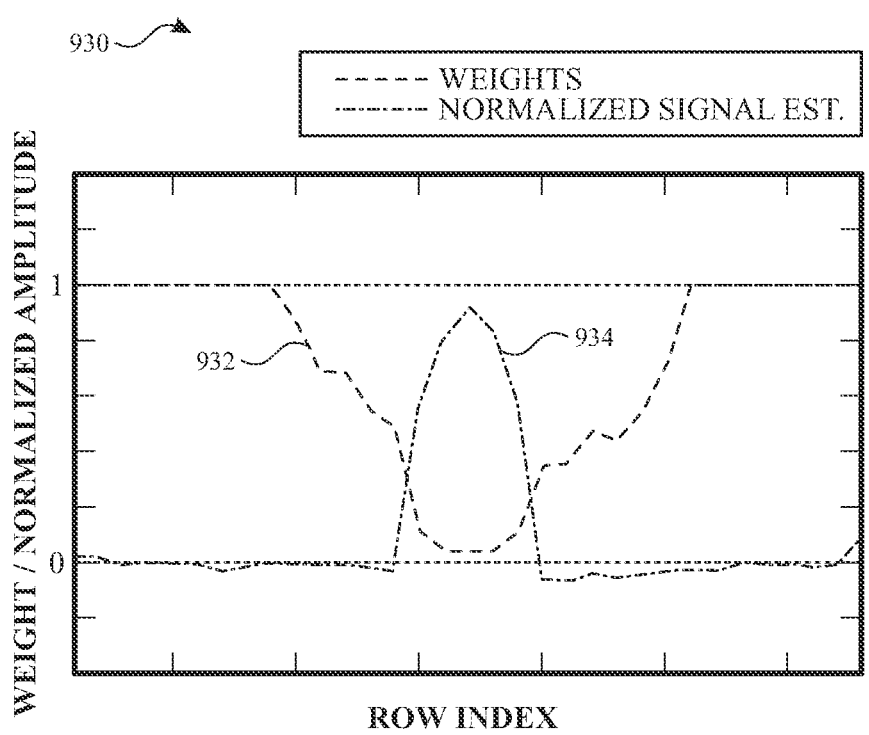
Figure 9E:
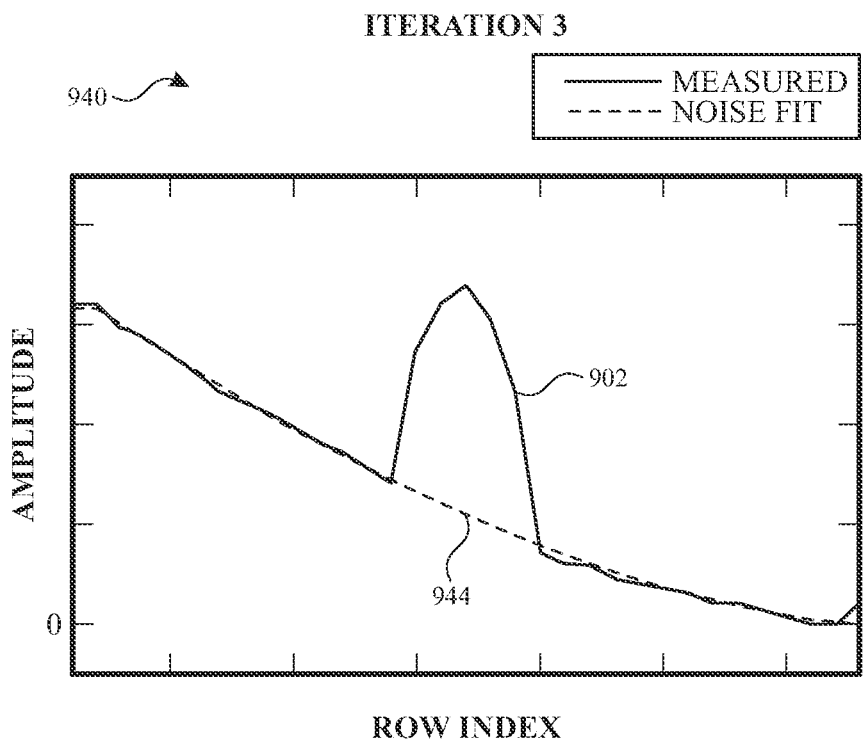
Figure 9F:
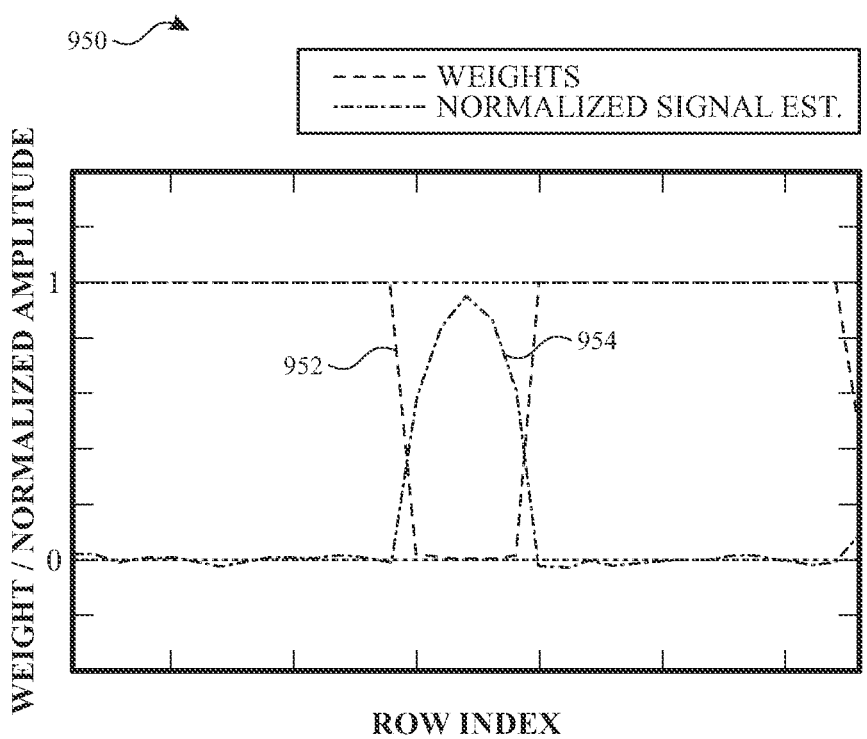

FIGS. 8A-8B illustrate an example plot 800 of a column vector 802 and an example plot 810 of corresponding weight vector 812 according to examples of the disclosure. Both plots 800 and 810 are indexed to a row index for the column. FIG. 8A includes a threshold band, such that the weight value assigned for weight vector 812 at a given row index (e.g., representing the diagonal values for the weight matrix) can be maximum (e.g., 1) for a value of the touch signal in column vector 802 at the given row index within the threshold band. The weight value assigned for weight vector 812 at a given row index can be less than the maximum (e.g., less than 1) for a value of the touch signal in column vector 802 at the given row index outside the threshold band. As shown in FIGS. 8A-8B, the minimum weight of weight vector 812 can correspond to the maximum touch signal value in FIG. 8A, with peak 804 of the column vector 802 appearing at a location with an inverted peak 814 of the weight vector 812. In some examples, the threshold range can be defined using the noise threshold of the touch sensor panel (e.g., $\sigma_n$).

Referring back to FIG. 6, a weighted least squares regression can be used to filter the second touch image at block 604. In some examples, the weighted least squares formula can be expressed as $\hat{\alpha} = (S^T W^T W S)^{-1} S^T W^T W r$, where $\hat{\alpha}$ can represent an estimate of coefficients vector for a linear combination of the characteristic vectors for the column, S and $S^T$ can represent a matrix of the characteristic vectors for the column (such that $S\alpha$ can represent a linear combination of the characteristic vectors in the matrix according to the coefficients) and its transpose matrix, W and $W^T$ can represent the weight matrix (e.g., diagonal matrix $W_{ii}$ described above) and its transpose, and r can represent a respective column vector for the second touch image. Performing the weighted linear regression can fit the characteristic vectors of noise to the column vector, weighted to exclude the touch signal (according to the filtered first touch image), and then subtract the fitted noise from the column vector of the second touch image. The weighted least squares regression can be performed on a per-column basis for each column in the second touch image. The output filtered second touch image from block 604 can essentially include a measure of the common mode signal for each column in the second touch image without the common mode noise. In some examples, the measure of the common mode signal can be a sum or an average (e.g., across the rows) of the touch signals in each column vector.

In some examples, the weighted least squares regression at block 604 can use a first characteristic vector for each column of the second touch image (e.g., matrix S and $S^T$ can include one characteristic vector for a respective column vector). In some examples, multiple characteristic vectors can be used. For example, a first characteristic vector and a second characteristic vector (and optionally additional characteristic vectors) can be used for a respective column of the second touch image.

In some examples, the characteristic vector(s) used at blocks 602 and 604 can be the same characteristic vector(s) or can be drawn from the same set of characteristic vectors derived for the touch screen (e.g., using calibration described above). In some examples, different characteristic vector(s) can be used. For example, two sets of characteristic values can be derived for the touch screen. A first set of characteristic values can be derived as described above while updating the images on the display and a second set of characteristic values can be derived in a similar manner as above, but while the display is blanking. The first set of the characteristic values can be used for the common mode subtraction at block 602 and the second set of characteristic values can be used for the weighted least squares regression at block 604.

The composite touch image generated by combining (e.g., summing) the filtered first touch image and the filtered second touch image at block 606 can remove most common mode noise while maintaining common mode touch signal. The composite touch image can be further processed at block 608 to further filter the composite touch image and remove noise. In some examples, the further processing can include a regression (or other suitable fitting technique) to further remove display noise from the composite touch image. In some examples, the regression can be an iterative re-weighted least squares (IRLS) regression technique. In some examples, the IRLS regression technique can use the same weighted least squares formula as described above with respect to block 604 that can be expressed for each iteration as $\hat{\alpha}=(S^T W^T WS)^{-1} S^T W^T Wr$, where $\hat{\alpha}$ can represent an estimate of coefficients vector for a linear combination of the characteristic vectors for the column, S and $S^T$ can represent a matrix of the characteristic vectors for the column and its transpose matrix, W and $W^T$ can represent the weight matrix and its transpose, and r can represent a respective column vector for the second touch image. However, the weight matrix W can be reweighted for each iteration of the weighted least square regression, where the touch signal estimate for the column vector can be updated to remove the noise from the prior iteration's estimate of noise (e.g., $\hat{f}=r-S \alpha$) for the purposes of reweighting. The characteristic vector(s) used at block 608 can be the same characteristic vector(s) or can be drawn from the same set of characteristic vectors derived for the touch screen as used for filtering the first touch image or the second touch image. In some examples, different characteristic vector(s) can be used.

FIGS. 9A-9F illustrate example plots 900, 910, 920, 930, 940 and 950 of iterations of an iterative reweighted least squares regression according to examples of the disclosure. Plots 900 and 910 illustrate a first iteration of the IRLS regression. The column vector 902 (e.g., corresponding to a column of composite image in block diagram 600) of plot 900 can be used for the first iteration. An initial weight vector 912 shown in plot 910 can be estimated. In some examples, the weight vector 912 can have values assigned maximum weight (e.g., 1) in a first iteration. The values of the weighted vector 912 can be used as the weight matrix in the first iteration of the IRLS regression. Fitted noise vector 904 in plot 900 can be generated as a first estimate of noise using the first iteration of weighted linear regression. The output vector 914 for the first iteration in plot 910 shows the results of subtracting the fitted noise vector 904 from the column vector 902 using the first weight matrix (normalized for ease of illustration).

Plots 920 and 930 illustrate a second iteration of the IRLS regression. The same column vector 902 (e.g., corresponding to a column of composite image in block diagram 600) of plot 900 can be used for the second iteration as shown in plot 920. A new weight vector 932 (reweighted vector) shown in plot 930 can be estimated (e.g., using the expression for computing weights described above with respect to block 610). For example, weight vector 932 can have values assigned maximum weight (e.g., 1) in the second iteration for those values of the output vector 914 from the first iteration of the IRLS regression that are less than a threshold from zero (e.g., within a threshold band) and a lower weight can be assigned in the second iteration for those values of the output vector 914 from the first iteration of the IRLS regression that are greater than a threshold from zero (e.g., outside of the threshold band). The values of the new weight vector 932 can be used as the weight matrix in the second iteration of the IRLS regression. Fitted noise vector 924 in plot 920 can be generated as a second estimate of noise using the second iteration of weighted linear regression. The output vector 934 for the second iteration in plot 930 shows the results of subtracting the fitted noise vector 924 from the column vector 902 using the second weight matrix (normalized for ease of illustration).

Plots 940 and 950 illustrate a third iteration of the IRLS regression. The same column vector 902 (e.g., corresponding to a column of composite image in block diagram 600) of plot 900 can be used for the third iteration as shown in plot 940. A new weight vector 952 (reweighted vector) shown in plot 950 can be estimated (e.g., using the expression for computing weights described above with respect to block 610). For example, weight vector 952 can have values assigned maximum weight (e.g., 1) in the third iteration for those values of the output vector 934 from the second iteration of the IRLS regression that are less than a threshold from zero (e.g., within a threshold band) and a lower weight can be assigned in the third iteration for those values of the output vector 934 from the second iteration of the IRLS regression that are greater than a threshold from zero (e.g., outside of the threshold band). The values of the new weight vector 952 can be used as the weight matrix in the third iteration of the IRLS regression. Fitted noise vector 944 in plot 940 can be generated as a third estimate of noise using the third iteration of weighted linear regression. The output vector 954 for the third iteration in plot 950 shows the results of subtracting the fitted noise vector 944 from the column vector 902 using the third weight matrix (normalized for ease of illustration). In some examples, output vector 954 can be the output column in the clean touch image output from block 608.

It is understood that FIGS. 9A-9F illustrate iterations of the IRLS regression for one column of the composite touch image, but that the IRLS regression can be performed in a similar matter for the remaining columns in the touch image. Additionally, it is understood that although three iterations are shown in FIGS. 9A-9F that the number of iterations may be different in different examples. In some examples, the number of iterations can be two iterations. In some examples, the number of iterations can be four (or more) iterations. The number of iterations can be a tradeoff between processing complexity and accuracy of noise removal. For example, as shown in FIGS. 9A-9F, the fit of the estimate of noise improves from the first iteration to the second iteration, and from the second iteration to the third iteration. In some examples, the number of iterations can be dynamically adjusted (e.g., based on a mode of operation). For example, in a low-power mode (or when battery level of a device is less than a threshold), the number of iterations of the IRLS regression can be reduced compared with the number of iterations of the IRLS regression when not in the low-power mode (or when battery level of a device is greater than a threshold).

In some examples, the robustness of the linear regression techniques at block 608 can be improved. In some examples, the threshold band used for weighting can be different for different iterations. For example, the column weights for a respective column can be computed using the following modified expression for each iteration:

$$W_{ii}^k = \frac{m_k \sigma_n}{\max(m_k \sigma_n, |\hat{f}|)},$$

where $\sigma_n$ can represent a constant threshold corresponding to the noise threshold of the touch sensor panel (e.g., Gaussian white noise), $|\hat{f}|$ can represent the magnitude of the touch signal vector for the column (e.g., in the composite touch image), and $W_{ii}^k$ can represent the weight matrix indexed to iteration k, and $m_k$ can be a scaling factor indexed to iteration k. In some examples, $m_k$ can be one for the final iteration and greater than one for earlier iterations. In some examples, $m_k$ can be an integer that decreases by one for each iteration until reaching one for the final iteration. Using the scaling factor can scale the threshold band to be wider for earlier iterations and narrower for later iterations. As a result, the weighting for the column vector can more gradually be reduced as more certainty is achieved about which portions of the column vector correspond to noise and which portion of the column vector correspond to touch signal. In some examples, values of $m_k$ for each iteration can be optimized to maximize noise removal. In some examples, and $m_k$ can have a non-integer value, $m_k$ can have a value different than 1 for the final iteration, and $m_k$ may not decrease for each iteration and/or by an integer amount.

In some examples, the robustness of the linear regression techniques at block 608 can be improved by using different numbers of characteristic vectors for different iterations. For example, in a first iteration of the IRLS regression a first number of characteristic vectors can be used and for a second, later iteration of the IRLS regression a second, higher number of characteristic vectors can be used. Using fewer characteristic vectors can reduce the complexity of processing because the matrix of the characteristic vectors, S, can be smaller.

Referring back to FIG. 6, in some examples, the robustness of the linear regression techniques at block 608 can be improved by using a regularization term. For example, the IRLS regression can be performed using the regularization term that can be expressed for each iteration as $$\hat{\alpha} = \left(\sigma_n \sum_{\alpha}^{-1} + S^T W^T W S\right)^{-1} S^T W^T W r,$$

where $\hat{\alpha}$ can represent an estimate of coefficients vector for a linear combination of the characteristic vectors for the column, S and $S^T$ can represent a matrix of the characteristic vectors for the column and its transpose matrix, W and $W^T$ can represent the weight matrix and its transpose, r can represent a respective column vector for the second touch image, and $$\sigma_n \sum_{\alpha}^{-1}$$

can represent the regularization term. The regularization term can include $\sigma_n$ representing white noise (Gaussian) for the touch screen and $$\sum_{\alpha}^{-1}$$

representing a covariance matrix with coefficients on the diagonal representative of the relative covariance of the characteristic vectors. The amount of regularization can tradeoff between accuracy of the fit of noise to the column vector versus distortion. Better fitting can, in some examples, achieve more accurate noise removal at the cost of increased distortion.

The amount of regularization can be adjusted at block 612. For example, the weighted least squares regression at block 604 may not filter out the common mode well for a column vector with few or no values with signal below the threshold (and therefore having low weights) due to detection touch along most or all of the column of the touch screen. In some such examples, the regularizations provided by block 612 to block 608 can result in more aggressive regularization for the IRLS regression at block 608, in particular for the characterization vector(s) that were previously used for the weighted least squares regression at block 604. In some examples, when one or more column weight criteria are satisfied, first regularizations can be used for IRLS regression and when the one or more column weight criteria are not satisfied, second regularizations can be used for IRLS. The first regularizations can allow for more aggressive noise removal compared with the second regularizations. In some examples, the one or more column weight criteria can include a criterion that is satisfied when a threshold number of the column weights for a column are below a threshold. In some examples, and average of the column weights can be computed and the one or more column weight criteria can include a criterion that is satisfied when the average column weight is less than a threshold. In some examples, other statistics of the column weights can be computed and used as criteria to determine whether to adjust the regularization. In some examples, the first regularization can allow for more aggressive fitting (and thereby noise removal) for some characteristic vectors (e.g., a first principal component) as compared with other characteristic vectors for a column in the composite touch image.

Figure 10:
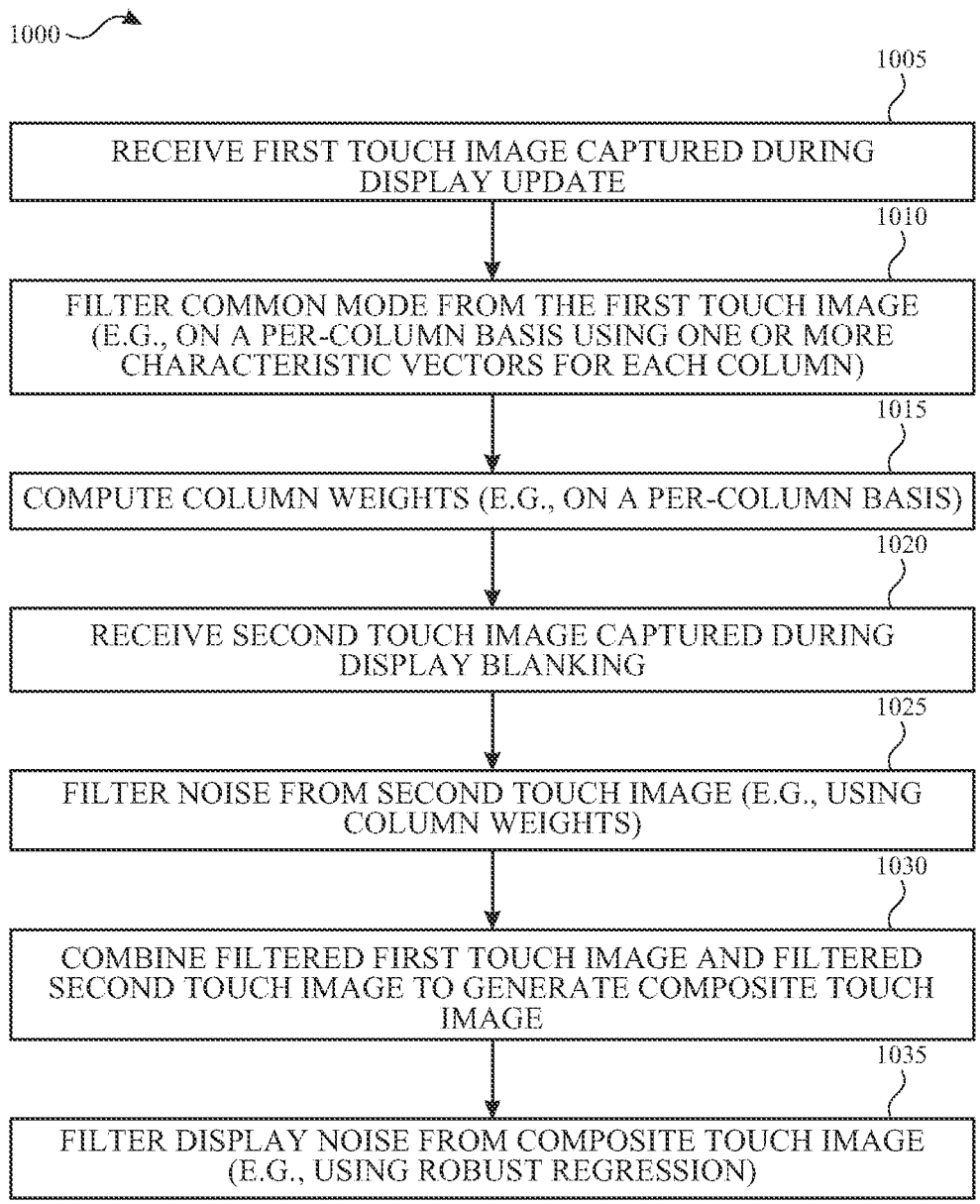
FIG. 10 illustrates an example process for display noise correction according to examples of the disclosure.

FIG. 10 illustrates an example process 1000 for display noise correction according to examples of the disclosure. At 1005, the system can receive a first touch image captured concurrently with a display update. In some examples, the first touch image can be captured using a mutual capacitance scan. In some examples, the first touch image can be captured using a self-capacitance scan. In some examples, the touch sensor panel can at least partially remove common mode noise (e.g., via the sensing circuitry). At 1010, the system can filter common mode noise from the first touch image to generate a filtered first touch image. The filtering can be performed on a per-column basis, subtracting from a respective column vector of the first touch image a projection of the respective column vector onto a first characteristic vector for the respective column, as described with respect to block 602. At 1015, column weights can be computed using the filtered first touch image. The computation of weights can be performed on a per-column basis, computing a weight for each row-index of a respective column using the amplitude of the signal, and assigning relatively less weight for row-indexes of the respective column with signal representative of touch and assigning relatively higher weight for row-indexes of the respective column with signal representative of noise. In some examples, the computation of weights can be performed using the mathematical expression described herein with respect to block 610.

At 1020, the system can receive a second touch image captured concurrently with display blanking (e.g., while the display is not updating). In some examples, the second touch image can be captured using a mutual capacitance scan. In some examples, the second touch image can be captured using a self-capacitance scan. At 1025, the system can filter noise from the second touch image to generate a filtered second touch image. The filtered second touch image can include an estimate of common mode touch signal without common mode noise. The filtering can be performed using a weighted least squares regression (or other suitable fitting technique) to remove noise, such as a mean offset component of the display noise associated with a displayed image on the display, as described with respect to block 604. The filtering can be performed on a per-column basis. At 1030, the filtered first touch image and the second filtered touch image can be combined (e.g., as described with respect to block 606) to form a composite touch image.

At 1035, the composite touch image can be filtered to remove any remaining display noise. For example, a robust regression such as an iterative reweighted least squares regression can be used as described with reference to block 608, and optionally using regularization (e.g., on a per-column basis).

Figure 11:
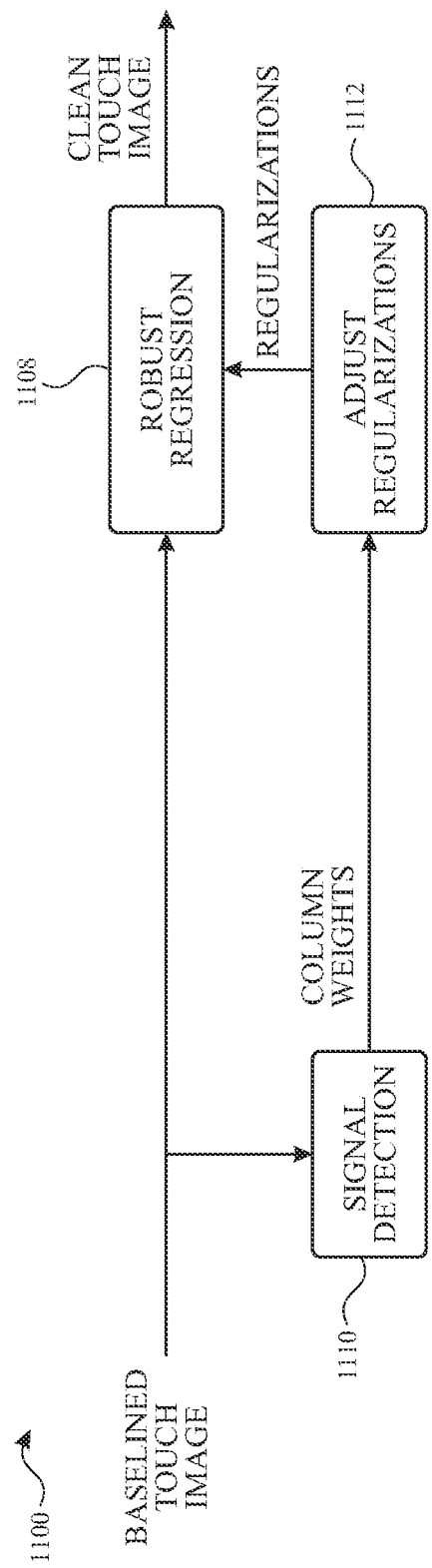
FIG. 11 illustrates another example block diagram for display noise correction according to examples of the disclosure.

It is understood that the blocks of block diagram 600 and the operations of process 1000 are examples, and that fewer, more or different blocks or operations can be used for display noise removal. In some examples, robust regression at block 608 can be applied to the first touch image without capturing a second touch image, without filtering at blocks 602 and 604, and without generating a composite image at block 606. In some such examples, the robust regression at block 608 can be performed without regularizations. In some such examples, the signal detection at block 610 can be used to determine column weights using the first touch image (rather than the filtered first touch image), and the column weights can be used to adjust regularizations at block 612. For example, FIG. 11 illustrates an example block diagram 1100 for display noise correction according to examples of the disclosure. In block diagram 1100, a robust regression (e.g., IRLS regression) at block 1108 (e.g., corresponding to block 608) can be applied to the baselined touch image (e.g., corresponding to the first touch image of block diagram 600) to remove display noise. Adjustable regularization in accordance with column weights in the first touch image can be implemented by blocks 1110 and 1112 (e.g., corresponding to blocks 610 and 612, respectively).

Therefore, according to the above, some examples of the disclosure are directed to an electronic device. The electronic device can comprise: processing circuitry configured to be coupled to a touch sensor panel. The processing circuitry can be configured to: receive a first touch image from a touch sensor panel, the first touch image captured concurrently with an updating of a display in proximity to the touch sensor panel; receive a second touch image from the touch sensor panel, the second touch image captured concurrently with a blanking the display; generate a composite touch image based on the first touch image and the second touch image; and reduce noise in the composite touch image using a plurality of characteristic vectors for a plurality of columns of the touch sensor panel. Additionally or alternatively to one or more of the examples disclosed above, in some examples, the processing circuitry can be further configured to: filter common mode from the first touch image to generate a filtered first touch image. Filtering the common mode can comprise subtracting, for each column of the first touch image, a projection of a respective column of the first touch image onto a respective characteristic vector of the plurality of characteristic vectors of the respective column. Additionally or alternatively to one or more of the examples disclosed above, in some examples, the processing circuitry can be further configured to: compute column weights for columns of the filtered first touch image. Column weights can be relatively higher for signal values in a column below a threshold and relatively lower for signal values in the column above the threshold. Additionally or alternatively to one or more of the examples disclosed above, in some examples, the processing circuitry can be further configured to: filter noise in the second touch image using one or more characteristic vectors of the plurality of characteristic vectors for each column of the second touch image and using the column weights. Additionally or alternatively to one or more of the examples disclosed above, in some examples, filtering the noise in the second touch image can comprise performing a weighted least squares regression using the column weights and at least a first respective characteristic vector for each column to estimate the noise and subtract the noise from each column. Additionally or alternatively to one or more of the examples disclosed above, in some examples, generating the composite touch image can comprise summing the filtered first touch image and the filtered second touch image. Additionally or alternatively to one or more of the examples disclosed above, in some examples, reducing noise in the composite touch image can comprise performing an iterative weighted least squares regression using column weights computed using the composite touch image and using the plurality of characteristic vectors for the plurality of columns to estimate the noise and subtract the noise from each column in the composite image. Additionally or alternatively to one or more of the examples disclosed above, in some examples, the iterative weighted least squares regression can comprise re-weighting the column weights for each iteration. Additionally or alternatively to one or more of the examples disclosed above, in some examples, the iterative weighted least squares regression can comprise regularization based on a relative covariance of the plurality of characteristic vectors. Additionally or alternatively to one or more of the examples disclosed above, in some examples, the amount of regularization can be adjusted based on the column weights for columns of the filtered first touch image.

Some examples of the disclosure are directed to a method. The method can comprise: receiving a first touch image from a touch sensor panel, the first touch image captured concurrently with an updating of a display in proximity to the touch sensor panel; receiving a second touch image from the touch sensor panel, the second touch image captured concurrently with a blanking the display; generating a composite touch image based on the first touch image and the second touch image; and reducing noise in the composite touch image using a plurality of characteristic vectors for a plurality of columns of the touch sensor panel. Additionally or alternatively to one or more of the examples disclosed above, in some examples, the method can further comprise: filtering common mode from the first touch image to generate a filtered first touch image. Filtering the common mode can comprise subtracting, for each column of the first touch image, a projection of a respective column of the first touch image onto a respective characteristic vector of the plurality of characteristic vectors of the respective column. Additionally or alternatively to one or more of the examples disclosed above, in some examples, the method can further comprise: computing column weights for columns of the filtered first touch image. Column weights can be relatively higher for signal values in a column below a threshold and relatively lower for signal values in the column above the threshold. Additionally or alternatively to one or more of the examples disclosed above, in some examples, the method can further comprise: filtering noise in the second touch image using one or more characteristic vectors of the plurality of characteristic vectors for each column of the second touch image and using the column weights. Additionally or alternatively to one or more of the examples disclosed above, in some examples, filtering the noise in the second touch image can comprise performing a weighted least squares regression using the column weights and at least a first respective characteristic vector for each column to estimate the noise and subtract the noise from each column. Additionally or alternatively to one or more of the examples disclosed above, in some examples, generating the composite touch image can comprise summing the filtered first touch image and the filtered second touch image. Additionally or alternatively to one or more of the examples disclosed above, in some examples, reducing noise in the composite touch image can comprise performing an iterative weighted least squares regression using column weights computed using the composite touch image and using the plurality of characteristic vectors for the plurality of columns to estimate the noise and subtract the noise from each column in the composite image. Additionally or alternatively to one or more of the examples disclosed above, in some examples, the iterative weighted least squares regression can comprise re-weighting the column weights for each iteration. Additionally or alternatively to one or more of the examples disclosed above, in some examples, the iterative weighted least squares regression can comprise regularization based on a relative covariance of the plurality of characteristic vectors. Additionally or alternatively to one or more of the examples disclosed above, in some examples, the amount of regularization is adjusted based on the column weights for columns of the filtered first touch image.

Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
processing circuitry configured to be coupled to a touch sensor panel, wherein the processing circuitry is configured to:
receive a first touch image from a touch sensor panel, the first touch image captured concurrently with an updating of a display in proximity to the touch sensor panel;
receive a second touch image from the touch sensor panel, the second touch image captured concurrently with a blanking the display;
generate a composite touch image based on the first touch image and the second touch image; and
reduce noise in the composite touch image using a plurality of characteristic vectors for a plurality of columns of the touch sensor panel.

2. The electronic device of claim 1, the processing circuitry further configured to:
filter common mode from the first touch image to generate a filtered first touch image, wherein filtering the common mode comprises subtracting, for each column of the first touch image, a projection of a respective column of the first touch image onto a respective characteristic vector of the plurality of characteristic vectors of the respective column.

3. The electronic device of claim 2, the processing circuitry further configured to:
compute column weights for columns of the filtered first touch image, wherein column weights are relatively higher for signal values in a column below a threshold and relatively lower for signal values in the column above the threshold.

4. The electronic device of claim 3, the processing circuitry further configured to:
filter noise in the second touch image using one or more characteristic vectors of the plurality of characteristic vectors for each column of the second touch image and using the column weights.

5. The electronic device of claim 4, wherein filtering the noise in the second touch image comprises performing a weighted least squares regression using the column weights and at least a first respective characteristic vector for each column to estimate the noise and subtract the noise from each column.

6. The electronic device of claim 5, wherein generating the composite touch image comprises summing the filtered first touch image and the filtered second touch image.

7. The electronic device of claim 2, wherein reducing noise in the composite touch image comprises performing an iterative weighted least squares regression using column weights computed using the composite touch image and using the plurality of characteristic vectors for the plurality of columns to estimate the noise and subtract the noise from each column in the composite image.

8. The electronic device of claim 7, wherein the iterative weighted least squares regression comprises re-weighting the column weights for each iteration.

9. The electronic device of claim 7, wherein the iterative weighted least squares regression comprises regularization based on a relative covariance of the plurality of characteristic vectors.

10. The electronic device of claim 9, wherein an amount of regularization is adjusted based on the column weights for columns of the filtered first touch image.

11. A method comprising:
receiving a first touch image from a touch sensor panel, the first touch image captured concurrently with an updating of a display in proximity to the touch sensor panel;
receiving a second touch image from the touch sensor panel, the second touch image captured concurrently with a blanking the display;
generating a composite touch image based on the first touch image and the second touch image; and
reducing noise in the composite touch image using a plurality of characteristic vectors for a plurality of columns of the touch sensor panel.

12. The method of claim 11, further comprising:
filtering common mode from the first touch image to generate a filtered first touch image, wherein filtering the common mode comprises subtracting, for each column of the first touch image, a projection of a respective column of the first touch image onto a respective characteristic vector of the plurality of characteristic vectors of the respective column.

13. The method of claim 12, further comprising:
computing column weights for columns of the filtered first touch image, wherein column weights are relatively higher for signal values in a column below a threshold and relatively lower for signal values in the column above the threshold.

14. The method of claim 13, further comprising:
filtering noise in the second touch image using one or more characteristic vectors of the plurality of characteristic vectors for each column of the second touch image and using the column weights.

15. The method of claim 14, wherein filtering the noise in the second touch image comprises performing a weighted least squares regression using the column weights and at least a first respective characteristic vector for each column to estimate the noise and subtract the noise from each column.

16. The method of claim 15, wherein generating the composite touch image comprises summing the filtered first touch image and the filtered second touch image.

17. The method of claim 11, wherein reducing noise in the composite touch image comprises performing an iterative weighted least squares regression using column weights computed using the composite touch image and using the plurality of characteristic vectors for the plurality of columns to estimate the noise and subtract the noise from each column in the composite image.

18. The method of claim 17, wherein the iterative weighted least squares regression comprises re-weighting the column weights for each iteration.

19. The method of claim 17, wherein the iterative weighted least squares regression comprises regularization based on a relative covariance of the plurality of characteristic vectors.

20. A non-transitory computer readable storage medium storing instructions, which when executed by an electronic device including processing circuitry, cause the processing circuitry to:
   receive a first touch image from a touch sensor panel, the first touch image captured concurrently with an updating of a display in proximity to the touch sensor panel;
   receive a second touch image from the touch sensor panel, the second touch image captured concurrently with a blanking the display;
   generate a composite touch image based on the first touch image and the second touch image; and
   reduce noise in the composite touch image using a plurality of characteristic vectors for a plurality of columns of the touch sensor panel.

* * * * *